United States Patent
Rose et al.

(10) Patent No.: US 6,203,700 B1
(45) Date of Patent: Mar. 20, 2001

(54) PROCESS FOR TREATING METAL-CONTAINING ACID WATER

(75) Inventors: Peter Dale Rose; John Richard Duncan; Robert Paul Van Hille; Genevieve Ann Boshoff, all of Grahamstown (ZA)

(73) Assignee: Water Research Commission, Pretoria (ZA)

( * ) Notice: Subject to any disclaimer, the term of this patent is extended or adjusted under 35 U.S.C. 154(b) by 0 days.

(21) Appl. No.: 09/364,820

(22) Filed: Jul. 30, 1999

(51) Int. Cl.⁷ ........................................... C02F 3/32
(52) U.S. Cl. ................ 210/602; 210/603; 210/605; 210/630; 210/631; 210/719; 435/262.5
(58) Field of Search ................. 210/602, 603, 210/610, 630, 631, 719, 730, 912, 723, 724, 605; 435/262, 262.5

(56) References Cited

U.S. PATENT DOCUMENTS

| | | | |
|---|---|---|---|
| 3,780,471 | * | 12/1973 | Ort . |
| 3,839,198 | * | 10/1974 | Shelef . |
| 4,333,263 | * | 6/1982 | Adey . |
| 4,354,937 | * | 10/1982 | Hallberg . |
| 4,690,894 | * | 9/1987 | Brierley et al. . |
| 5,062,956 | * | 11/1991 | Lupton et al. . |
| 5,316,751 | * | 5/1994 | Kingsley et al. . |
| 5,510,032 | * | 4/1996 | Vail et al. . |
| 5,573,669 | * | 11/1996 | Jensen . |
| 5,587,079 | * | 12/1996 | Rowley et al. . |
| 5,645,730 | * | 7/1997 | Malachosky et al. . |
| 5,736,048 | * | 4/1998 | Ibeanusi . |

* cited by examiner

Primary Examiner—David A. Simmons
Assistant Examiner—Fred Prince
(74) Attorney, Agent, or Firm—James Ray & Associates

(57) ABSTRACT

A process for treating metal-containing acid water comprises adding an alkaline aqueous component to metal-containing acid water, thereby to raise the pH of the acid water and to cause metals therein to precipitate. The precipitated metals are separated from the water in a separation stage. The water is then passed to a biological alkalinity generating stage wherein the alkalinity of the water is increased biologically. The alkaline aqueous component, which is added to the metal-containing acid water, is withdrawn from the alkalinity generating stage. Treated water is also withdrawn from the alkalinity generating stage.

16 Claims, 10 Drawing Sheets

Figure 1:
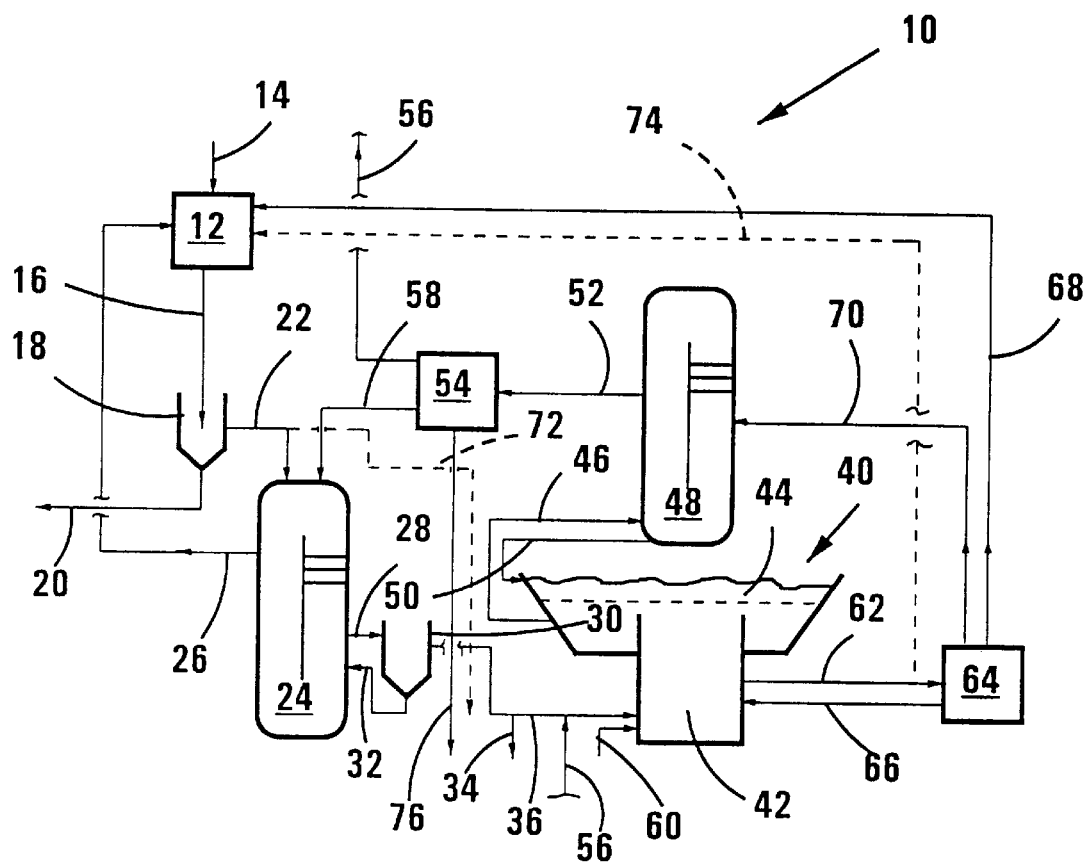

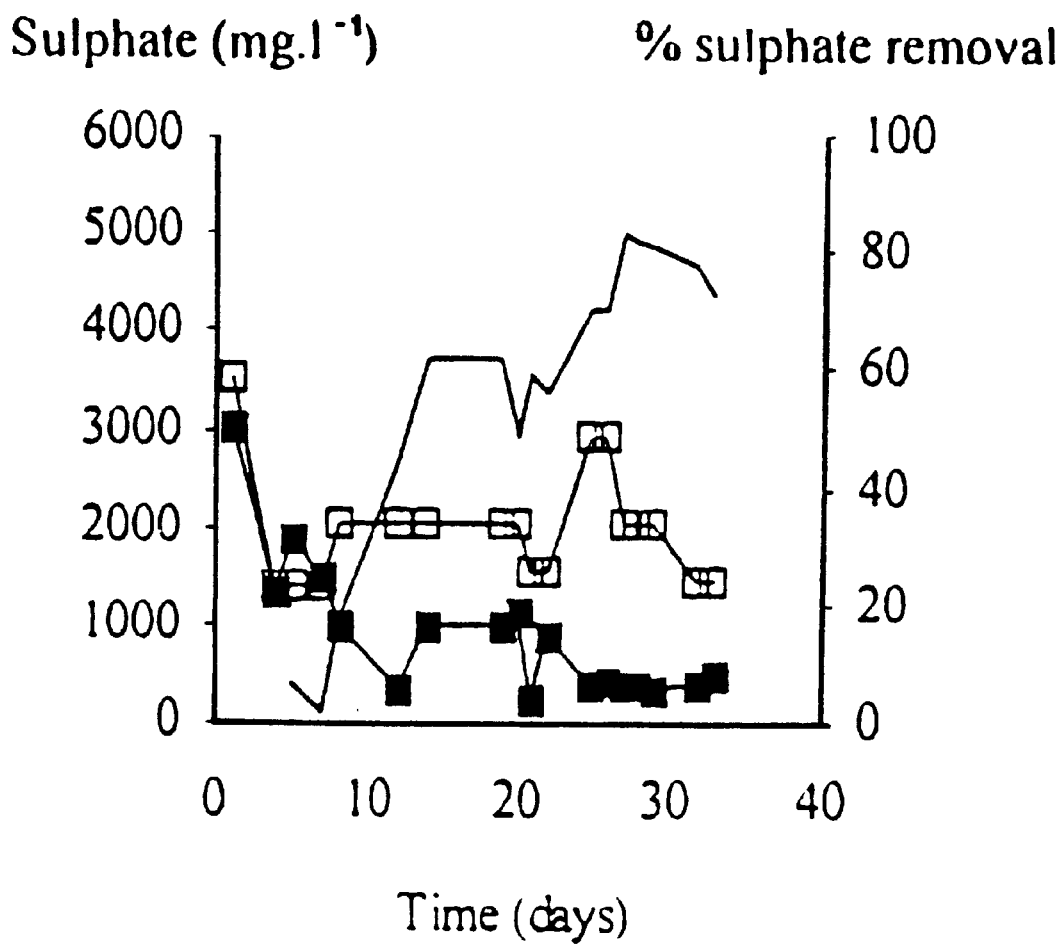
*Fig. 2.* Sulphate reduction in an upflow anaerobic digester fed a tannery effluent synthetic mine water solution. Open square = inlet sulphate concentration; closed square = outlet sulphate concentration; line = % sulphate removal.

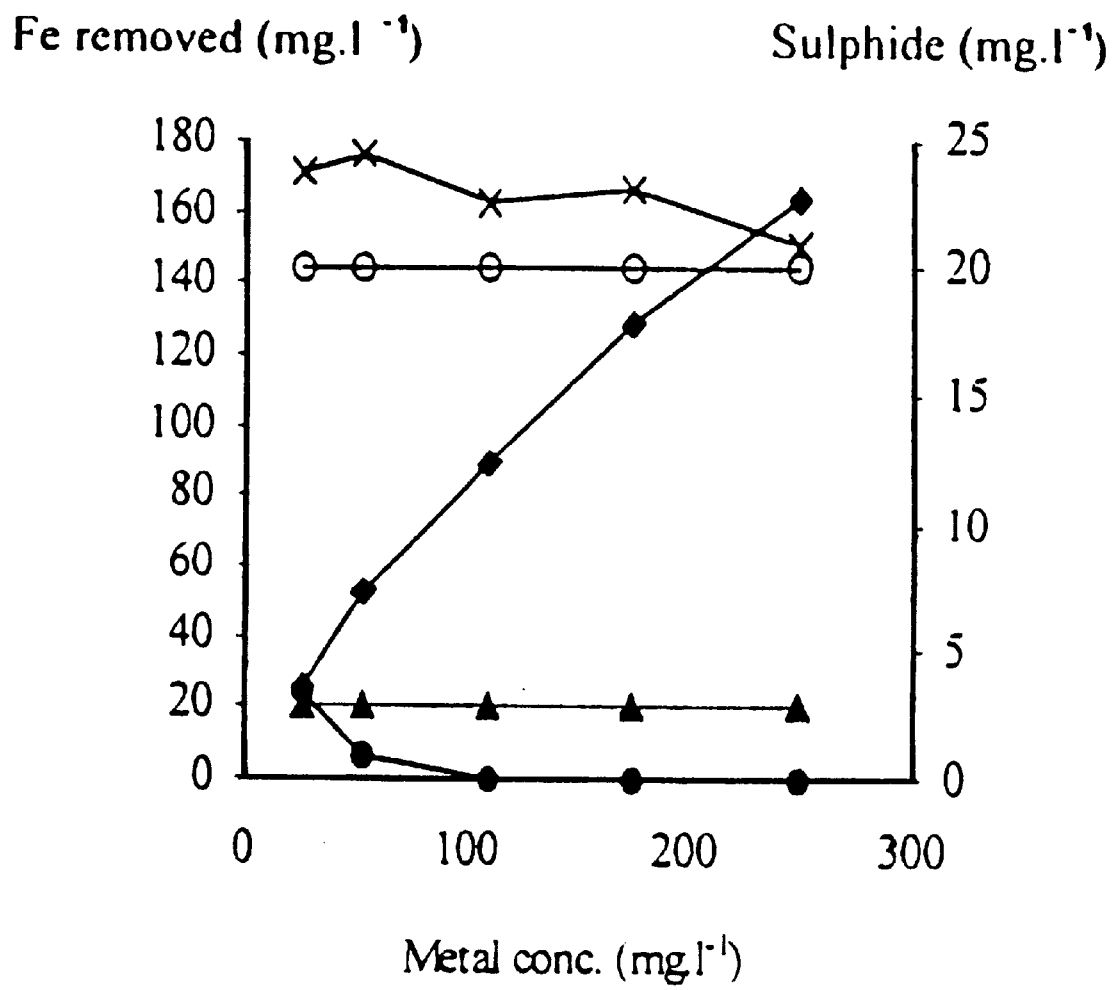

*Fig. 3.* Iron removal from a synthetic mine water solution with the addition of a sulphide-rich tannery effluent-fed anaerobic sulphate reducing reactor overflow liquor. Cross = total sulphide; open circle = dissolved sulphide before addition of iron; closed circle= dissolved sulphide after addition of iron; triangle= anticipated stochiometric metal removal; diamond= total metal removal obtained during the experiment.

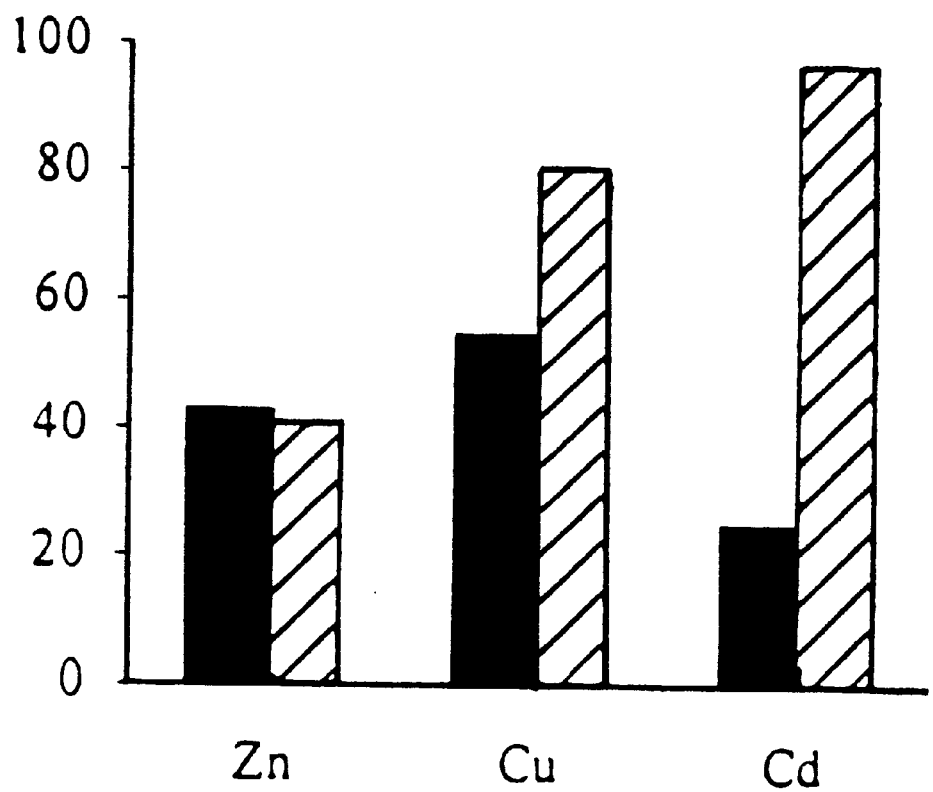
*Fig. 4.* Percentage removal of metals from zinc refinery wastewater pond and slimes dam seep effluents using sulphide-rich overflow liquor from a tannery-fed sulphate reducing digester. Closed column = pond effluent (Zn 6000 mg.l$^{-1}$; Cu 97.8 mg.l$^{-1}$, Cd 14 mg.l$^{-1}$) ; striped column = seep effluent (Zn 996 mg.l$^{-1}$; Cu 28.6 mg.l$^{-1}$, Cd 4.7 mg.l$^{-1}$).

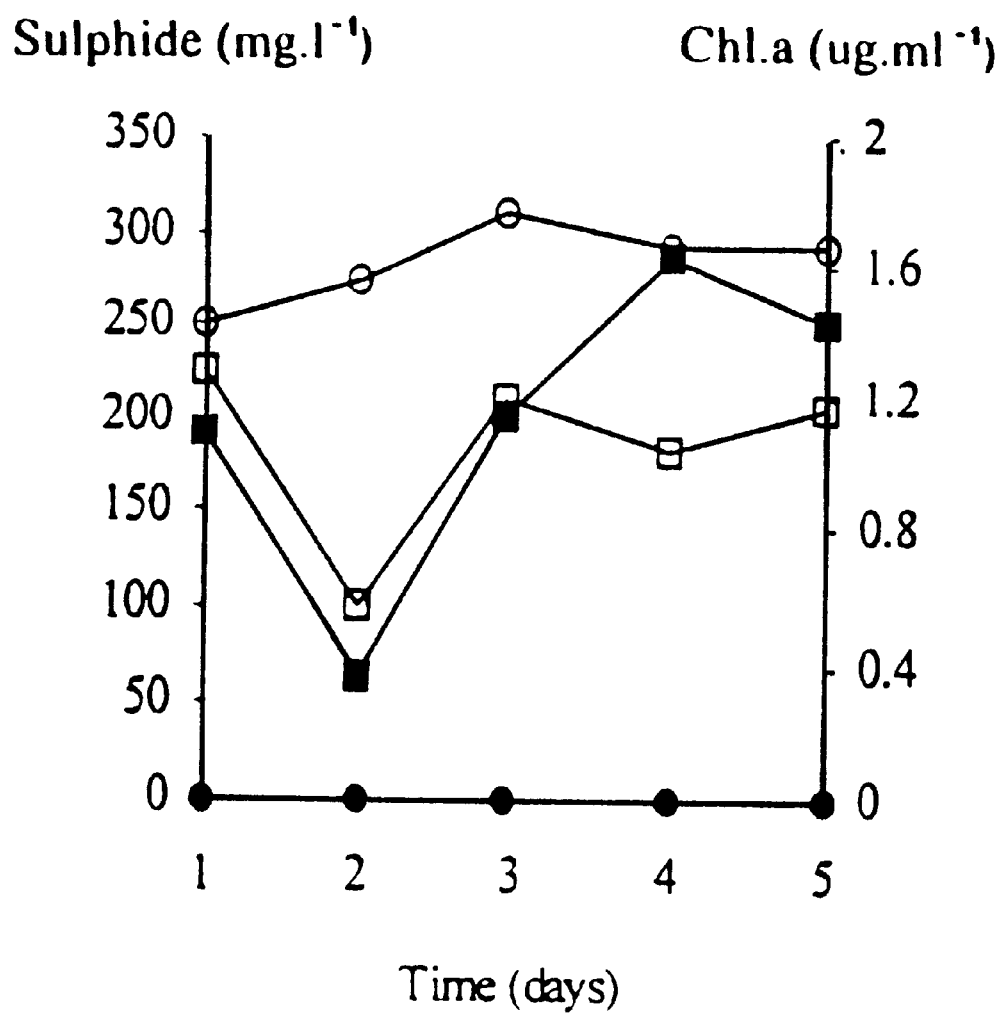
*Fig.5.* Effect of sulphide addition to a *Spirulina* culture. Open circle = sodium sulphide daily feed to the culture pH9, closed circle = residual dissolved sulphide in the growth medium, open square = chl.a concentarion sulphide fed culture medium, closed circle = chl.a concentration control culture without sulphide feed.

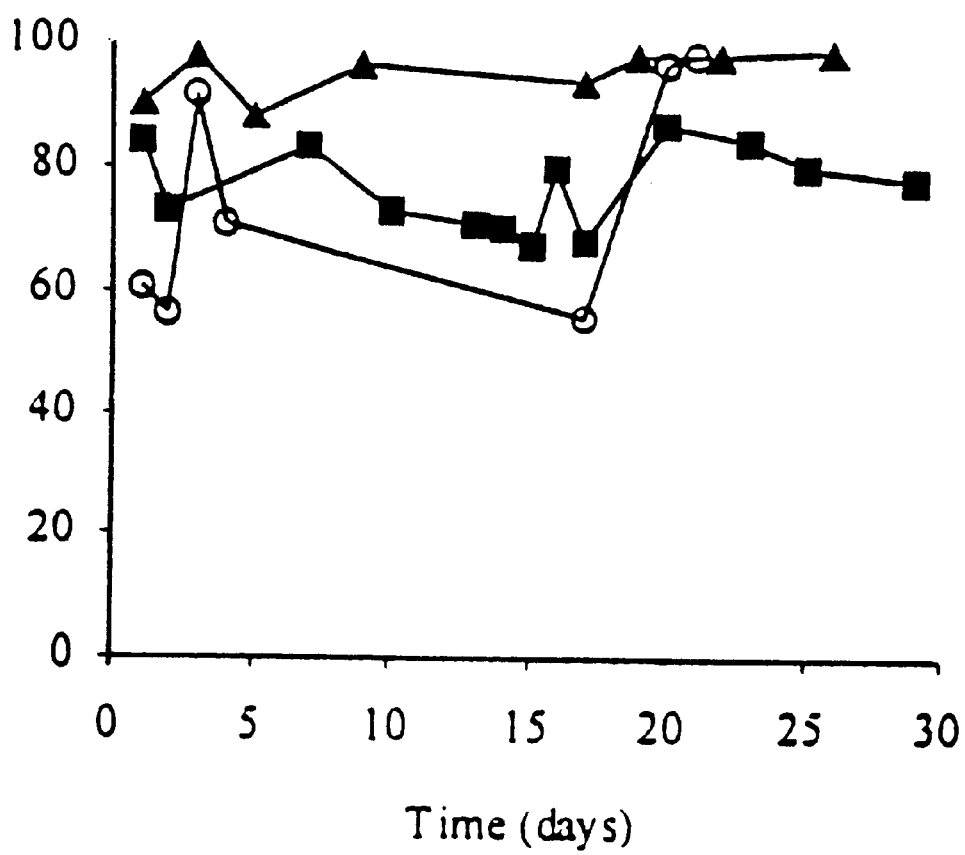
*Fig. 6.* Sulphate removal in an upflow digester fed different concentrations of algal biomass as the sole carbon source for sulphate reducing bacteria. Results reflect the mean of three analyses. Triangle = $4 g.l^{-1}$ algal biomass; square = $8 g.l^{-1}$ algal biomass; open circle = $10 g.l^{-1}$ algal biomass.

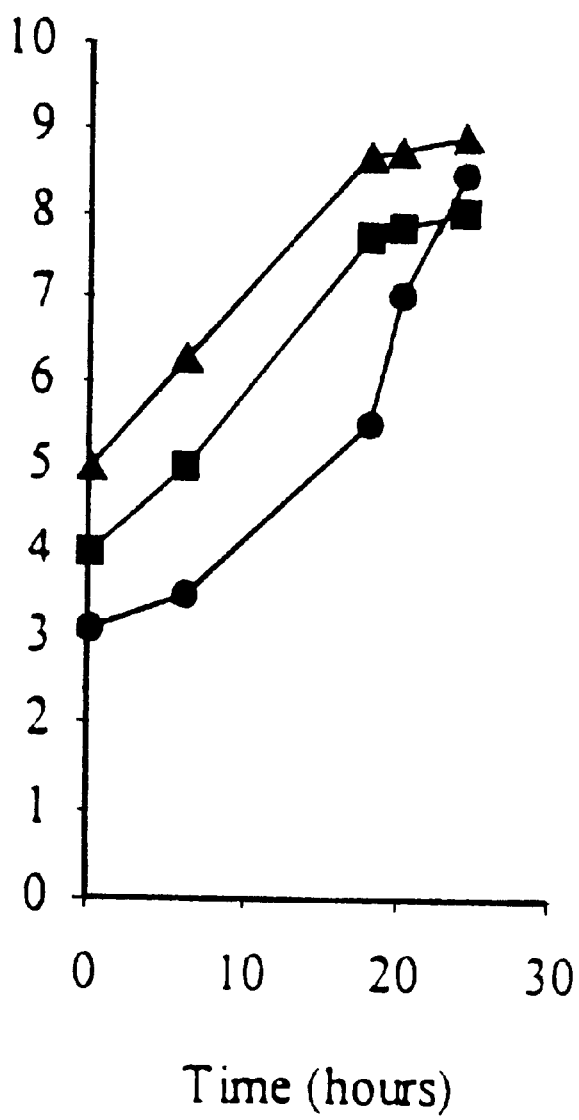
*Fig. 7.* Realkalisation rate of a *Spirulina* culture where pH has been reduced to 3, 4 and 5 respectively. Triangle = pH5; square = pH 4; circle = pH3.

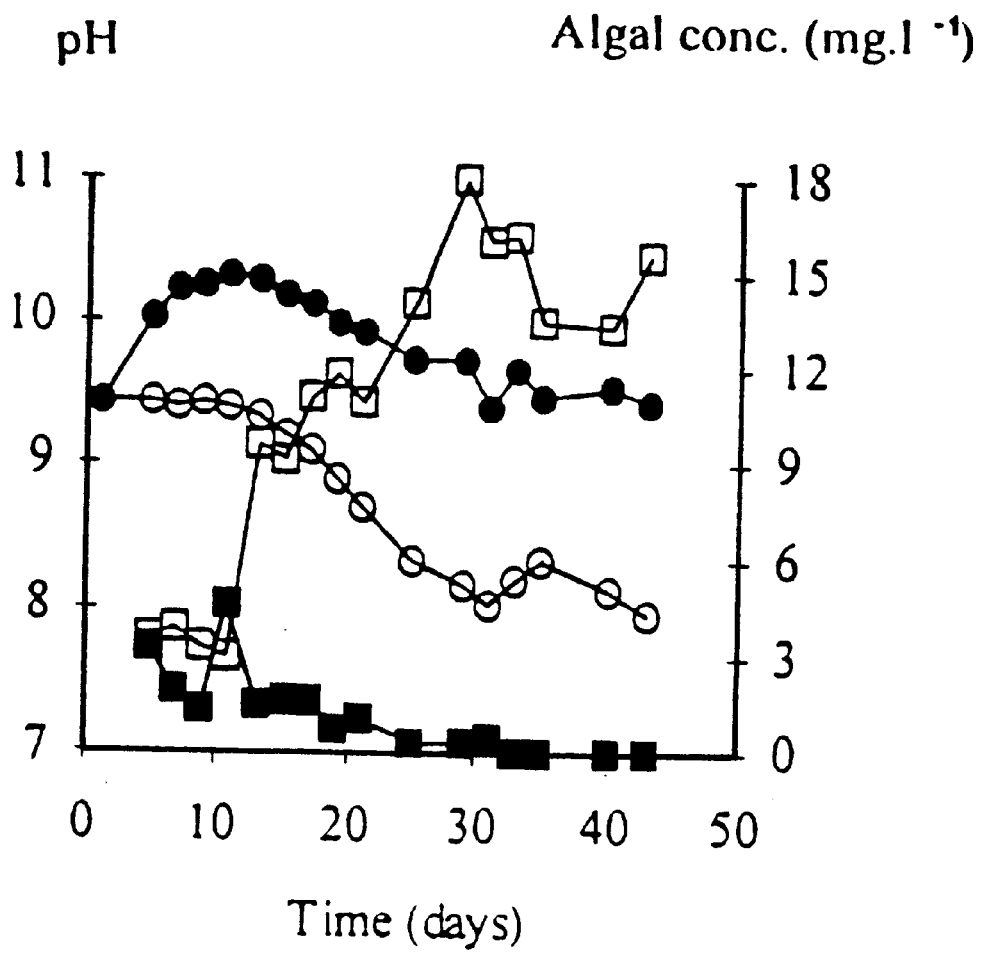
*Fig.8.* Response of a *Spirulina* culture to a continuous loading regime of AMD at 10% reactor volume.day$^{-1}$. Closed square = algal concentration of cultures fed 10% AMD. day$^1$; open square = algal concentration of control cultures fed 10%growth medium. day$^{-1}$; closed circle = pH of algal culture fed 10% AMD.day$^{-1}$; open circle = pH of AMD without algae.

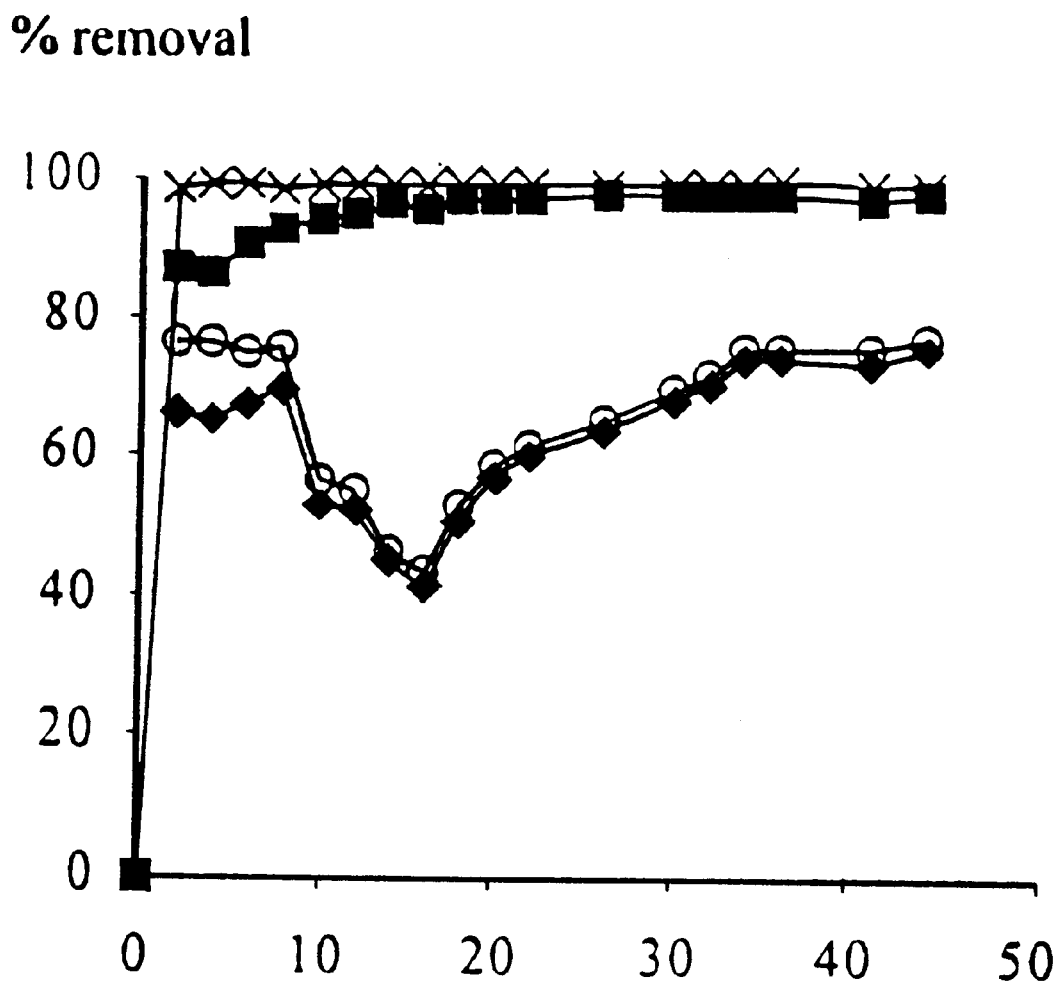
*Fig.9.* Cumulative removal of heavy metal component in a *Spirulina* culture under continuous loading of AMD at a rate of 10%.day$^{-1}$ total volume. Cross = Fe; square = Zn, open circle = Pb; diamond= Cu.

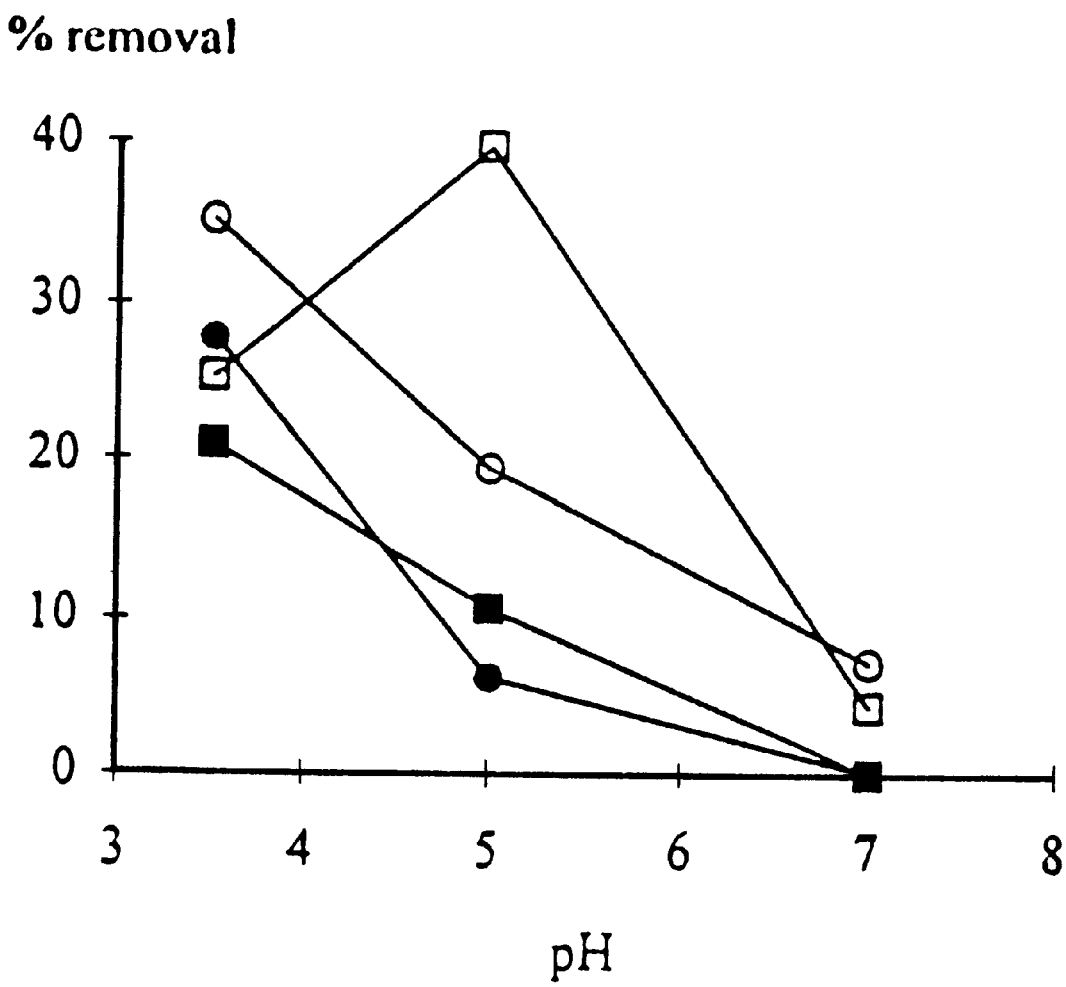
*Fig. 10.* Metal removal capacity of extracellular metal complexing compounds released to the growth medium by live *Spirulina* cells. Open square = 1000 mg.l$^{-1}$ Cu solution; closed square = 100 mg.l$^{-1}$ Cu solution; open circle = 1000 mg.l$^{-1}$ Fe solution; closed circle = 100 mg.l$^{-1}$ Fe solution.

PROCESS FOR TREATING METAL-CONTAINING ACID WATER

THIS INVENTION relates to the treatment of water. It relates more particularly to the treatment of acid water. Still more particularly, it relates to a process for treating metal-containing acid water, such as acid mine waste water or effluent.

According to a first aspect of the invention, there is provided a process for treating metal-containing acid water, which process comprises

- adding an alkaline aqueous component to metal-containing acid water, thereby to raise the pH of the acid water and to cause metals therein to precipitate;
- separating, in a separation stage, the precipitated metals from the water;
- passing the water to a biological alkalinity generating stage wherein the alkalinity of the water is increased biologically;
- withdrawing the alkaline aqueous component, which is added to the metal-containing acid water, from the alkalinity generating stage; and
- withdrawing treated water from the alkalinity generating stage.

The biological alkalinity generation may, more particularly, be effected by means of algae, while the alkaline aqueous component may comprise hydroxide and carbonate anions. The process is thus based on the ability of algae to increase the alkalinity, ie raise the pH, of their surrounding medium.

While, at least in principle, the process can be used for treating any metal-containing acid water, the Applicant believes that the process will have particular application in the treatment of heavy metal-containing acidic effluents or waste waters, such as acid mine drainage. By adding sufficient alkaline aqueous component to the acidic effluent or waste water, the majority of the metals are precipitated as metal hydroxides and metal carbonates as a result of increased alkalinity achieved by adding the alkaline aqueous component thereto. Sufficient of the alkaline aqueous component may be used so as substantially to neutralize the acid water and substantially to neutralize the acidic effluent or waste water.

The alkalinity generating stage may comprise an algal growth vessel or pond. The vessel or pond may be fitted with a mixing device in order to facilitate an even suspension of algal cells and to ensure or promote even distribution of light throughout algae- containing culture present therein.

The process may then include, from time to time, or continuously, as the case may be, withdrawing some of the algae-containing treated water from the vessel or pond, separating algae therefrom, and returning the algae to the vessel or pond. This withdrawal may be effected either actively, eg by pumping the algae-containing aqueous component from the vessel, or passively, eg by means of gravity flow thereof from the vessel. Typically, the pond may comprise a raceway or high rate algal pond.

The separation of the algae from the treated water may be effected by passing the algae-containing treated water through at least one separation device, such as a gravity settler. Instead, in another example of a suitable separation device, the algae-containing treated water may initially be passed through a primary screen located at an outlet from the algal growth vessel or pond, to prevent large amounts of algae from flushing out of the growth vessel or pond with the treated water; thereafter the treated water may be passed through at least one primary filter to trap the majority of the algae which pass through the primary screen, with the primary filter also constituting an algae harvesting stage from which algae which are removed from the treated water are harvested for further processing or return to the algal growth vessel or pond; and thereafter the treated water may be passed through at least one secondary filter which acts as a final screen to remove algae which have passed through the primary screen and the primary filter.

The treated water emerging from the separation device will thus consist of higher pH, eg non-acidic or neutral, water containing a minimum of algal biomass.

The addition of the alkaline aqueous component to the acid water or effluent may be effected in a mixing stage, which may typically comprise a mixer or reaction vessel into which both the alkaline aqueous component and the acid water are introduced. As discussed hereinbefore, the effluent is typically acid mine effluent or drainage water having a low pH, typically around 2–4, and a high heavy metal load, typically around 10–3000 ppm, comprising heavy metals such as iron, copper, lead and zinc. As the pH of the acid water increases due to the alkaline aqueous component mixed therewith, the metals precipitate out. The mixed water components or streams, together with the precipitated heavy metals, pass to the separation stage. Sludge, containing the precipitated heavy metals, is removed from the bottom of the separating stage, which typically comprises a settler, and may be further processed, eg to recover valuable metals therefrom.

The treated water from the vessel or pond may be subjected to further processing. For example, it may be subjected to final polishing to remove trace amounts of metal. Such polishing may comprise treating it with a biosorbent, such as *Azolla filiculoids*. The further processing may also comprise passing the water through an anaerobic digester.

However, heavy metal-containing acid waste waters such as acid mine effluent or acid mine drainage, or zinc refinery waste water, usually contain significant quantities of dissolved sulphate anions. An additional source of sulphate ions may be added, if desired. This may conveniently be a sulphate waste source. The process may then include, if desired, feeding the sulphate-containing waste water from the alkalinity generating stage into a pond or trench; subjecting the sulphate-containing waste water to biological sulphate reduction in the pond or trench, thereby to convert dissolved sulphate anions in the waste water to dissolved sulphide anions; and withdrawing treated waste water from the pond.

When a trench is used, it may be in accordance with ZA 98/3970 or AU 65949/98, which both claim priority from ZA 97/4165, and which are thus incorporated herein by reference. When a pond is used, it may be in accordance with our copending South African and USA patent applications, both claiming priority from ZA 98/3203, which are thus also incorporated herein by reference, and which are entitled "The Treatment of Water".

The process may, in addition to adding the alkaline aqueous component to the metal-containing acid water, also include adding sulphide anions to the acid water, eg in or ahead of the mixing stage, to aid in precipitation of metals therefrom. Thus, the metals will then additionally precipitate as metal sulphides, which will also be removed in the separation stage.

At least part of the sulphide anions which are added to the acid water may be those obtained by withdrawing treated sulphide-containing waste water from the pond or trench; stripping gaseous components, particularly hydrogen sulphide, therefrom in a stripping stage; returning the stripped waste water to the pond or trench; and adding the gaseous hydrogen sulphide to the metal-containing acid water. However, in another embodiment of the invention, at least part of the sulphide anions which are added to the acid water may instead or additionally be those obtained by withdrawing treated sulphide-containing waste water from the pond or trench, and adding it directly to the metal-containing acid water.

The exact nature of the metal precipitates will thus depend on the pH of the acid water after the alkaline aqueous component has been added thereto, and the proportion of sulphide ions added thereto.

The addition of the sulphide ions can thus be controlled to achieve, in respect of the acid water to which it is added together with the alkaline aqueous component, precipitation of different metal species as hydroxides, carbonates and sulphides. These precipitated metal species can then readily be separated from one another using known separation techniques.

The addition of the alkaline aqueous component to the acid water, ie the addition of carbonate and hydroxide anions, can be controlled to establish, in respect of the acid water to which it is added, a pH gradient, which, at least in theory, can range from pH 1–10, thereby facilitating selective precipitation of individual species of metals from the metal-containing water.

The process thus provides an environmentally friendly system for metal removal from metal-containing waters or waste waters, especially those containing dissolved sulphates and which are acidic.

It will be appreciated that the process need thus not necessarily employ both the addition of the alkaline aqueous component, and the addition of the sulphide, to the metal-containing water. In other words, only one of these additives can suffice in certain cases.

Thus, according to a second aspect of the invention, there is provided a process for treating metal-containing acid water, which includes adding biologically derived anions to the metal-containing water, so that the anions react with at least one metal in the water and cause it to precipitate out; and separating, in a separation stage, the precipitated metal from the water.

The process may include passing treated water from the separation stage to a biological alkalinity generating stage wherein the alkalinity of the water is increased biologically, withdrawing an alkaline aqueous component containing carbonate anions and/or hydroxide anions from the alkalinity generating stage, and adding the alkaline aqueous component to the metal-containing water, with the biologically derived anions which are added to the water thus comprising carbonate and/or hydroxide anions. The biological alkalinity generation may be effected by means of algae, with the alkaline aqueous component comprising hydroxide and carbonate anions.

The alkalinity generating stage may, as hereinbefore described, comprise an algal growth vessel or pond fitted with a mixing device in order to facilitate an even suspension of the algal cells and to promote or ensure even distribution of light throughout algae-containing culture present therein.

The treated water from the algal growth vessel or pond may contain dissolved sulphate anions, and may then, as also hereinbefore discussed, be fed into a pond or trench where it is subjected to biological sulphate reduction, thereby to convert dissolved sulphate anions to dissolved sulphide anions, with treated waste water being withdrawn from the pond or trench.

Instead, or additionally, biologically derived sulphide anions may also be added to the metal-containing water. At least part of the sulphide anions which are added to the acid water may be those obtained by withdrawing treated sulphide-containing waste water from the pond or trench; stripping hydrogen sulphide therefrom in a stripping stage; returning the stripped waste water to the pond or trench; and adding the gaseous hydrogen sulphide to the metal-containing acid water, as also hereinbefore described. Instead, or additionally, at least part of the sulphide anions which are added to the acid water are those obtained by withdrawing treated sulphide-containing waste water from the pond or trench, and adding it directly to the metal-containing acid water.

The process may include adding both the alkaline aqueous component and the sulphide ions in controlled fashion to the water, which may be acid waste water as hereinbefore described, so as to establish, in respect of the waste water, a desired redox gradient so as to obtain precipitation of different metal species, as also hereinbefore described.

The process may then include separating the different metal species from one another.

The invention will now be described in more detail with reference to the accompanying drawings and the examples given hereunder.

In the drawings,

FIG. 1 shows a simplified flow diagram of a process according to the invention for treating waste water; and FIGS. 2 to 10 show, graphically, the results obtained in experiments which were conducted to simulate various of the stages of the process of FIG. 1.

Referring to FIG. 1, reference numeral 10 generally indicates a process for treating waste water, in accordance with the invention.

The process 10 includes a mixing stage 12, with a waste water feed line 14 leading into the stage 12.

A waste water line 16 leads from the mixing stage 12 to a settler 18, with a metal precipitate sludge withdrawal line 20 leading from the settler 18.

A waste water line 22 leads from the settler 18 to a high rate algal pond 24. A waste water line 26 leads from the algal pond 24 back to the mixing stage 12. A withdrawal line 28 leads from the pond 24 to a settler 30, with an algal biomass return line 32 leading from the bottom of the settler 30 back to the pond 24. A treated, ie sulphate-containing, waste water withdrawal line 36 leads from the settler 30, with a withdrawal line 34 optionally leading from the line 36.

The line 36 leads into a facultative pond, generally indicted by reference numeral 40. The faculative pond 40 comprises an anaerobic pit upflow digester 42, as well as a surface layer 44 of algae-rich oxygenated water.

A treated waste water line 46 leads from the pond 40 to a high rate algal pond 48, with an oxygenated water return line 50 leading from the pond 48 to the surface layer 44 of algae-rich oxygenated water in the pond 40.

A polished waste water line 52 leads from the pond 48 to a harvesting stage 54, with an algal biomass withdrawal line 56 leading from the harvesting stage 54 to the line 36. An algal biomass transfer line 58 leads from the harvesting stage 54 to the pond 24. A waste water withdrawal line 76 leads from the stage 54.

An organic carbon feed line 60 also leads into the pond 40.

waste water line 62 leads from the pond 40 to a gas stripper 64 with a stripped water return line 66 leading from the stripper 64 back to the pond 40. A hydrogen sulphide line 68 leads from the stripper 64 to the mixing stage 12, while a carbon dioxide line 70 leads from the stripper 64 to the pond 48.

An optional waste water line 72 leads from the line 22 to the line 36. Thus, by using the line 72, the pond 24 and settler 30 are by-passed.

An optional line 74 leads from the line 62 to the mixing stage 12. Thus, when the line 74 is used, the stripper 64 can be dispensed with, if desired.

In use, acidic mine effluent or waste water, containing dissolved sulphate anions and dissolved metal cations, enters the mixing stage 12 along the flow line 14. In the stage 12, hydrogen sulphide, entering along the line 68 and/or the line 74, is mixed with the mine effluent waste water, thereby causing precipitation of the metal cations, as metal sulphides. Simultaneously, the pH of the waste water is increased by means of alkaline water entering along the flow line 26. For example, the waste water may be neutralized by means of the alkaline water.

The resultant mixed waste water passes along the flow line 16 into the settler 18, where the precipitated metal sulphides are separated out and withdrawn along the line 20. The sulphate-containing waste water passes along the flow line 22 to the high rate algal pond 24, which functions as a stress reactor. Additional algal biomass enters the pond 24 along the line 58.

Treated sulphate-containing waste water, containing also algal biomass, enters the settler 30 where algal biomass may be separated from the sulphate-containing waste water. The algal biomass is returned to the pond 24 along the line 32. Treated waste water is withdrawn from the settler 30 along the line 36. Some of this water can be withdrawn from the process along the line 34, if desired. However, at least part, eg all, of the sulphate-containing waste water from the settler 30 passes along the line 36 to the facultative pond 40.

A carbon source, eg sewage, also enters the facultative pond 40 along the flow line 60. Biological reduction of sulphates thus takes place in the pond 40, with the sulphates being converted biologically to sulphides. Sulphide-containing waste water is withdrawn along the line 62 to the stripping stage 64 where carbon dioxide and hydrogen sulphide are stripped therefrom, with the stripped liquor returning to the pond 40 along the line 66. The hydrogen sulphide passes along the line 68 to the mixing stage 12.

Treated sulphate-lean waste water is withdrawn from the pond 40 along the line 46 to the high rate algal pond 48 which acts to polish the water, ie photosynthetic oxygen production takes place in the pond 48, as does reoxidation of residual sulphides and removal of nitrates and phosphates. Algae-rich oxygenated water is returned to the pond 40 from the pond 48, along the line 50, to form a surface layer of algae-rich oxygenated water 44 in the facultative pond 40.

Carbon dioxide, recovered in the stripper 64, enters the pond 48 along the line 70. The carbon dioxide is a nutrient for the pond 48.

Polished sulphate-lean waste water is withdrawn from the pond 48 along the line 52, and passes to the harvesting stage 54. In the harvesting stage 54, algal biomass is harvested or separated from the waste water, and withdrawn along the line 56. Some algal biomass is returned to the pond 24 along the line 58, with the balance passing to the digester 42 along the line 56.

Treated metal-free and sulphate-free waste water is withdrawn from the harvesting stage 54 along the line 76.

In the process 10, the facultative pond 40 is thus used for treating high volumes of waste water, for sulphate reduction.

Additionally, a complex 'low-grade' carbon waste source, eg the sewage, is used in the process 10, so that the process 10 results in a net disposal of such waste carbon sources.

The process 10 thus employs sulphate reducing bacteria to treat acid mine waste water. Acid mine drainage pollution may be associated with large water volume flows and exceptionally long periods of time over which the drainage may require treatment. The process 10 thus provides a means of treating such acid mine drainage. The process 10 provides high rates of sulphate reduction and precipitation of metal sulphides, in a waste stabilization ponding process. Simultaneously there is co-disposal of organic waste, and generation of algal biomass as an independent carbon source for sulphate reducing bacterial production.

Advantages of using the process 10 include: the earth work pond 40 is substantially less costly than a steel reinforced reactor vessel; renewable algal biomass is reliably produced in large amounts in the process 10; and the pond 40 can support high levels of sulphate reducing bacterial activity.

A number of the stages of the process 10 were evaluated on laboratory or pilot plant scale.

Materials and Methods

Sulphates and sulphides were analyzed according to Standard Methods. Chemical oxygen demand ('COD') was analyzed using a Merck (trade mark) Spectroquant Kit. Chlorophyll was extracted into 100% acetone and quantified according to Lichtenhaler HK (1987) Chlorophylls and Carotenoids: pigments of photosynthetic biomembranes. Methods in Enzymology 148:350–371. Borosilicate glassware was used in the metal binding experiments and the metal solutions were prepared using distilled water. Metals were analyzed on a GBC909AA (trade mark) Atomic Absorption Spectrophotometer linked to a GBC (trade mark) integrator. Total organic carbon ('TOC') was analyzed using a Dohrmann (trade mark) 180 Total Organic Carbon Analyzer.

Metal binding and removal studies were performed in 250 ml Erhlemeyer flasks. Metal removal was controlled against pure metal solution precipitation at the same pH and at the various metal concentrations tested. Reported results represent the difference between control and experimental readings. A 10 hour settling period was allowed for removal of metal precipitate.

An 8 l upflow anaerobic reactor was fed media with the following composition (g.l$^{-1}$): $NH_4Cl$ 0,5; $K_2HPO_4$ 1,0; $MgSO_4.7H_2O$ 0,2; $CaCl_2.2H_2O$ 0,1; $FeSO_4.7H_2O$ 0,1; $Na_2SO_4$ 0,5. Dried Spirulina sp. was used as the organic substrate. The reactor was seeded with sludge from a methanogenic reactor treating raw sewage. Gas production was monitored as well as sulphate reduction between inlet and overflow ports.

The Spirulina sp. culture for the metal binding studies was isolated from a tannery waste stability pond ('WSP'), grown and maintained in Zarouk's media (Zarouk C (1966) Contribution a l'Etude d'une Cyanophycee. Influence de Divers Facteurs Physiques et Chimiques sur las Croissance et al Photosynthese de *Spirulina maxima*, Thesis, University of Paris, France) at a constant temperature of 28° C. under cold white light with a light/dark cycle of 18:6 hours. Cells were harvested by filtration through a GF/C filter or a nylon mesh with a pore size of 50 microns.

Metal binding to Spirulina was measured in a culture harvested and resuspended in either Zarouk's media or water. The cultures were placed on a shaker at 60 rpm and metal of varying concentrations added. Samples were removed at time intervals and filtered through a 0,45 μm nylon membrane filter. The filter was digested with 200 µl concentrated $HNO_3$ and analyzed for metals as described above.

EXAMPLE 1
Tannery Effluent

The use of tannery effluent as a source of waste organic matter to provide the carbon and electron donor for the sulphate removal and sulphide production unit operations of the process was investigated. In addition to its high organic load tannery effluent also contains high levels of sulphate. Treatment plants are a rich source of adapted sulphate reducing bacterial ('SRB') making the system a useful research model for the study of SRB sulphide production processes.

A 1,5 m³ upflow anaerobic rector was used. The reactor was fed a stream of a tannery's mixed effluent drawn prior to treatment and mixed with a sulphate solution to produce a final concentration around 2000 $mg.l^{-1}$ $SO_4$ and a $COD:SO_4$ <0,5. This mixture simulates the flow, in FIG. 1, of a metal sulphate solution entering directly the anaerobic compartment of the facultative pond 40. An hydraulic retention time ('HRT') of 3 days was sustained in the reactor for the 60 day duration of the experiment and no methane production was observed. FIG. 2 shows the start-up period of this study, the achievement of an optimum sulphate reduction in the reactor around 80% and a conversion rate of over 500 mg $SO_4.l^{-1}$ reactor volume.$day^{-1}$. FIG. 3 shows the blending of reactor overflow liquor with a synthetic mine water solution to effect metal sulphide precipitation (2000 $mg.l^{-1}$ $SO_4$; 200 $mg.l^{-1}$ Fe; final pH 7,2) and shows the removal of iron at levels about 8 times the anticipated stoichiometric removal rate.

Metal removal from two zinc refinery waste streams was also evaluated. FIG. 4 shows total metal removal from a waste water pond and from a slimes dam seepage collection on the site. Zinc recovery levels of 2640 $mg.l^1$ and 438 $mg.l^{-1}$ were recorded in each case indicating the relatively large amounts of metals which can be removed using this approach.

EXAMPLE 2
Tannery Effluent

High rate pond technology for the treatment of tannery waste water was assessed in a facultative pond reactor followed by a high rate algal pond ('HRAP') supporting a near monoculture of the cyanobacterium Spirulina sp. The COD and sulphate/sulphide removal function of the system are given in Table 1.

TABLE 1

Performance of a facultative and high rate algal pond system treating tannery effluent showing sulphate reduction, sulphide oxidation and COD removal in the various stages of the process.

| | Tannery effluent | Facultative pond anaerobic compartment | Facultative pond aerobic cap | HRAP |
|---|---|---|---|---|
| Sulphate as $SO_4^{2-}$ | 975 | <1 | 989 | 809 |
| Sulphide as $Na_2S$ | 285 | 1100 | 76.5 | 0.1 |
| COD | 2474 | 1216 | 1216 | 394 |

Table 1 shows 100% sulphate reduction in the anaerobic compartment, a 92% reoxidation of sulphide produced in the aerobic facultative zone, which caps the facultative pond, thereby controlling sulphide emissions, followed by 100% final oxidation in the HRAP. An oxypause was established at a depth of 0,5 m from the surface of the facultative pond. An 84% reduction in COD load was achieved across the system. The metal removal function of the system was monitored. The results are given in Table 2.

TABLE 2

Heavy metal removal from tannery effluent in the anaerobic compartment of a facultative pond feeding a high rate algal pond ('HRAP'). Heavy metal adsorption by algal biomass in the HRAP is shown before and after the commissioning of the sulphide producing anaerobic unit operation in the flow path. Percentage total metal removal includes both biomass adsorption and metal sulphide precipitation.

| | Biomass metal concentration before sulphide treatment ($mg \cdot Kg^{-1}$) | Biomass metal concentration after sulphide treatment ($mg \cdot Kg^{-1}$) | Total metal removed (%) |
|---|---|---|---|
| Cadmium | 5.96 | <1 | 100 |
| Chromium | 25.8 | <1 | 100 |
| Cobalt | 22.4 | 3.3 | 85 |
| Iron | 2012 | 795 | 60 |
| Lead | 219 | 2.3 | 99 |
| Nickel | 49.2 | 17.5 | 64 |
| Zinc | 218.5 | 22.5 | 90 |

Table 2 shows the influent metal load from the tanning operation adsorbed by the microalgal biomass in the HRAP before and after commissioning the anaerobic sulphate reducing stage of the operation. The metal reduction of final treated water to 1 $mg.l^{-1}$, achieved by the joint action of sulphide precipitation followed by biomass adsorption, provides a demonstration of the acid mine drainage ('AMD') polishing quality which may be anticipated in the process 10. A 90% COD removal was recorded and methane formed 10% of free gas produced by the system. At an operating pH 8,3 no free sulphide release was detected above the pond surface. FIG. 5 shows the results of an investigation of the sulphide tolerance of the Spirulina sp. culture which established in the HRAP described above. It was found, in a series of sealed flask studies (head space flushed with nitrogen gas to exclude oxygen), that after an initial adaptation, growth was sustained even at the daily addition to the culture of a 300 $mg.l^{-1}$ sodium sulphide. The complete oxidation of the sulphide load by microalgal activity provides an indication of the efficiency that can be expected from the capping of the facultative pond with the HRAP recycle liquor.

EXAMPLE 3
Algal Biomass

The use of Spirulina sp. biomass produced in the above system, ie in Example 2, was investigated as a carbon source for sulphate reduction. The objective was to utilize the rapidly biodegradable fraction for sulphide production and to retain in solution the more slowly degraded cell structural components to be utilized for the subsequent metal adsorption unit operation. Biomass was harvested from the HRAP described above, dried, resuspended in tap water and fed to an 8 l upflow anaerobic digester with an HRT of 1 day. After reactor stabilization on the algal feed, the slurry was fed in a synthetic sulphate effluent-containing 800 $mg.l^{-1}$ $SO_4$, and at algal concentrations of 4,8 and 10 $g.l^{-1}$ for 40 days in each case. FIG. 6 shows percentage sulphate removal over 20 days of stable operation for each feed rate with an average COD removal of approximately 25%, and a $COD:SO_4$ conversion efficiency for the utilized component of the 4 g feed of 1,4:1. No methane production was observed over the study period. Metal uptake capacity of the reactor overflow was measured for Cu, Zn and Fe over a concentration range of 500 to 3000 mg.l$^{-1}$. Results of this study are reported in Table 3.

TABLE 3

Metal removal capacity of an anaerobic sulphate reducing digester overflow liquor from a digester fed a slurry of *Spirulina* as sole carbon and electron donor source. Results are reported as percentage metal ion removed over a concentration range 500 to 300 mg · l and standard deviations are reported in brackets.

| Metal | 500 mg · l$^{-1}$ | 1000 mg · l$^{-1}$ | 1500 mg · l$^{-1}$ | 2000 mg · l$^{-1}$ | 2500 mg · l$^{-1}$ | 3000 mg · l$^{-1}$ |
|---|---|---|---|---|---|---|
| Cu | 79.2 (±9.0) | 77.4 (±19.0) | 66.3(±14) | 46.4(±4) | 50.6 (±15.8) | 51.1 (±8.6) |
| Zn | 88.0 (±13) | 67.9 (±6.2) | 38.9(±16) | 32.6(±16) | 38.0 (±23) | 36.7(±19) |
| Fe | 100 | 51.0 (±17) | 41.3(±58) | 61.0(±4.9) | 57.1 (±4) | 60.3(±6.7) |

Table 3 indicates that total metal removal levels are substantially higher than anticipated stoichiometric metal sulphide formation, which, in this study, would account for only about 5% of total metal ions removed.

The results indicate that the potential metal binding capacity of the SRB-digested algal biomass may be enhanced by passing through the digester. More complete digestion of algal biomass will, of course, occur at HRT longer than one day. Algal biomass production within the ponding process offers a degree of independence from external supply of carbon sources.

EXAMPLE 4

Alkalization

The process 10 involves the use of alkalinity produced by algal photosynthesis in the precipitation and recovery of heavy metals. In the process 10, the recycle of alkalinity from the HRAP 24, and possibly also from the anaerobic compartment of the pond 40, is used to achieve the successful precipitation of certain mixtures of heavy metals. Formation and precipitation of metal sulphide/carbonate/hydroxide mixtures plays an important role in reducing the major fraction of the metal load in the incoming AMD, prior to passing to the anaerobic compartment of the pond 40, and to HRAP 48.

The ability of Spirulina cultures to rapidly realkalize their aquatic environment, following acidification with AMD, is illustrated in FIG. 7 for a biomass loading of 3 ug.ml$^{-1}$ chlorophyll a. In practice a continuous loading regime would be established to ensure a stable and elevated operating pH. FIG. 8 shows the survival of a Spirulina culture (1 ug.ml$^{-1}$ Chl a) together with its ability to sustain alkalinity production under a continuous loading regime with 10% AMD addition/day$^{-1}$. (pH 2 and metal concentration in mg.l$^{-1}$ Fe=95; Cu=1,08; Zn=2,2; Pb=1,52). FIG. 9 shows the metal removal efficiency in this reactor for the different components of the partly treated AMD feed. The chlorophyll a level decline, compared to control cultures, indicates stress conditions in this reactor and low growth rates which have, in turn, been shown to lead to increased production of extracellular metal complexing compounds by this organism (see also Example 5 hereunder). Both sustained alkalinity production as an AMD neutralizing step, together with an additional metal sequestering function, play an important role in assisting a pre-treatment precipitation operation, such as a HRAP 24 in FIG. 1, where the bulk of the incoming metal load may be recovered prior to entering the anaerobic compartment of the facultative pond 40. Poor Spirulina production in this unit indicates the requirement for continuous biomass production under optimum conditions in a separate reactor, such as HRAP 48 in FIG. 1. This may also serve as the final polishing step for water leaving the system.

EXAMPLE 5

Metal Complexing Compounds

It is likely that the production of extracellular metal complexing compounds in the form of capsular polysaccharides peptidoglycan and other fragments released from living algal cells plays some role as metal bioadsorbants in the metal removal functions discussed hereinbefore (Example 4). Metal removal contributed by this fraction was estimated by measuring the metal binding capacity of the cell free fraction of a Spirulina culture. The extracellular fraction was measured as total organic carbon ('TOC'). FIG. 10 shows percentage metal removal, at three pH values in the acid to neutral range, in the growth medium fraction from which the cells were removed by filtration through a GF/C glass fibre filter. The results show that the separable pre-digested extracellular fraction could account for between 20% to 40% of metal removal in the range evaluated and that this process operates best under acidic conditions. It was found that production of this fraction was linked to light stress with TOC yield increasing from 2,17 mg.l$^{-1}$ to 44,39 mg.l$^{-1}$ as light intensity was increased from 130 to 1000 μmoles. m$^{-2}$.sec$^{-1}$. Both high light and metal stresses may be manipulated in HRAP 24 to maximise production of the extracellular metal complexing fraction.

Recovery of sulphide and alkaline/metal complexing streams in the process 10, which are then fed to a pretreatment metal precipitation unit operation, offers the potential for the fine control of the selective precipitation of metal sulphide/carbonate/hydroxide complexes. This would enable the partial separation and refinement of incoming components suggesting the use of the process 10 in the remediation of a range of metal waste streams in addition to AMD.

In the process 10, an anaerobic compartment within a facultative pond is an effective sulphate reducing reactor for both COD reduction and the efficient removal of heavy metal contaminants. The HRAP 24, 48 not only serve as a final metal polishing step, but contribute to primary treatment of AMD by both neutralization and adsorption functions. The release of extracellular complexing compounds by microalgae and their role in metal binding also takes place. Algal biomass generated in the process provides a degree of independence from the supply of external carbon sources and is used in sulphide generation of SRB.

The process 10 thus involves an integration of various components of the ponding approach to AMD treatment, and has metal recovery and separation potential.

What is claimed is:

1. A process for treating metal-containing acid water, which process comprises adding an alkaline aqueous component comprising hydroxide and carbonate anions to metal-containing acid water, thereby to raise the pH of the acid water and to cause metals therein to precipitate;

separating, in a separation stage, the precipitated metals from the water;

passing the water from the separation stage to an algal growth vessel or pond containing algae and fitted with a mixing device in order to facilitate an even suspension of algal cells and to promote even distribution of light throughout algae-containing culture present in the pond, with the algal growth vessel or pond thus providing a biological alkalinity generating stage wherein the alkalinity of the water is increased biologically, and wherein algae-containing treated water is produced;

withdrawing alkaline water from algal growth vessel or pond with this alkaline water being added, as the alkaline aqueous component, to the metal-containing acid water;

withdrawing algae-containing treated water from the algal growth vessel or pond;

separating algae from the withdrawn algae-containing treated water by passing the algae-containing treated water through at least one separation device;

returning the separated algae to the algal growth vessel or pond; and withdrawing treated water from the separation device.

2. A process according to claim 1, wherein the metal-containing acid water is a heavy metal-containing acidic effluent or waste water, with sufficient alkaline aqueous component being added to the acidic effluent or waste water so that the majority of the metals are precipitated as metal hydroxides and metal carbonates as a result of increased alkalinity achieved by adding the alkaline aqueous component thereto, and substantially to neutralize the acidic effluent or waste water.

3. A process according to claim 1, wherein the addition of the alkaline aqueous component to the acid water is effected in a mixing stage which comprises a mixer or reaction vessel into which both the alkaline aqueous component and the acid water are introduced.

4. A process according to claim 3, wherein the treated water from the vessel or pond is subjected to final polishing to remove trace amounts of metal by treating it with a biosorbent and/or by passing the water through an anaerobic digester.

5. A process according to claim 3, wherein the treated water from the separation device contains dissolved sulphate anions and is fed into a pond or trench where it is subjected to biological sulphate reduction, thereby to convert dissolved sulphate anions to dissolved sulphide anions, with treated water being withdrawn from the pond or trench, and with the process including adding sulphide anions to the acid water in or ahead of the mixing stage, to aid in precipitation of metals therefrom, and with the metals then additionally precipitating as metal sulphides, which are also removed in the separation stage.

6. A process according to claim 5, wherein at least part of the sulphide anions which are added to the acid water are those obtained by withdrawing treated sulphide-containing waste water from the pond or trench; stripping hydrogen sulphide therefrom in a stripping stage; returning the stripped waste water to the pond or trench; and adding the gaseous hydrogen sulphide to the metal-containing acid water.

7. A process according to claim 5, wherein at least part of the sulphide anions which are added to the acid water are those obtained by withdrawing treated sulphide-containing waste water from the pond or trench, and adding it directly to the metal-containing acid water.

8. A process according to claim 5, wherein the addition of the sulphide ions is controlled to achieve, in respect of the acid water to which it is added together with the alkaline aqueous component, precipitation of different metal species as hydroxides, carbonates and sulphides.

9. A process according to claim 1, wherein the addition of the alkaline aqueous component to the acid water is controlled to establish, in respect of the acid water to which it is added, a pH gradient, thereby facilitating selective precipitation of metals from the metal-containing water.

10. A process for treating metal-containing acid water, which process comprises adding an alkaline aqueous component to metal-containing acid water, thereby to raise the pH of the acid water and to cause metals therein to precipitate;

separating, in a separation stage, the precipitated metals from the water;

passing the water to a biological alkalinity generating stage wherein the alkalinity of the water is increased biologically and wherein dissolved sulphate anion-containing treated water is produced;

withdrawing alkaline water from the alkalinity generating stage with this alkaline water being added, as the alkaline aqueous component, to the metal-containing acid water;

withdrawing dissolved sulphate anion-containing treated water from the alkalinity generating stage;

feeding the dissolved sulphate anion-containing treated water from the alkalinity generating stage into a facultative pond;

feeding a carbon source into the facultative pond;

subjecting the dissolved sulphate anion-containing treated water to biological sulphate reduction in the facultative pond, thereby to convert dissolved sulphate anions to sulphide anions which are also dissolved in the waste water; and withdrawing treated waste water from the facultative pond.

11. A process according to claim 10, wherein the metal-containing acid water is a heavy metal-containing acidic effluent or waste water, with sufficient alkaline aqueous component being added to the acidic effluent or waste water so that the majority of the metals are precipitated as metal hydroxides and metal carbonates as a result of increased alkalinity achieved by adding the alkaline aqueous component thereto, and substantially to neutralize the acidic effluent or waste water.

12. A process according to claim 10, which includes passing the treated water from the facultative pond to a high rate algal pond in which photosynthetic oxygen production, reoxidation of residual sulphides, and removal of nitrates and phosphates takes place;

returning algae-rich oxygenated water from the high rate algal pond to the facultative pond, to form a surface layer of algae-rich oxygenated water in the facultative pond;

withdrawing polished waste water from the high rate algal pond and passing it to a harvesting stage;

harvesting algal biomass from the waste water in the harvesting stage; and withdrawing treated waste water from the harvesting stage.

13. A process according to claim 10, wherein the biological alkalinity generation is effected by means of algae, with the alkaline aqueous component comprising hydroxide and carbonate anions; and wherein the alkalinity generating stage comprises an algal growth vessel or pond fitted with a mixing device in order to facilitate an even suspension of algal cells and to promote even distribution of light throughout algae-containing culture present therein.

14. A process according to claim 10, wherein biologically derived sulphide anions are also added to the metal-containing water.

15. A process according to claim 14, wherein at least part of the sulphide anions which are added to the metal-containing water are those obtained by withdrawing treated sulphide-containing waste water from the facultative pond; stripping hydrogen sulphide therefrom in a stripping stage; returning the stripped waste water to the facultative pond; and adding the gaseous hydrogen sulphide to the metal-containing water.

16. A process according to claim 14, wherein at least part of the sulphide anions which are added to the metal-containing water are those obtained by withdrawing treated sulphide-containing waste water from the facultative pond and adding it directly to the metal-containing water.

* * * * *